United States Patent [19]

Hoshino et al.

[11] Patent Number: 5,333,973
[45] Date of Patent: Aug. 2, 1994

[54] CUTTING OIL SUPPLYING DEVICE FOR A TAP

[76] Inventors: Kiyoshi Hoshino, 645 Yamanokami, Yabuzuka-Honmachi-Oaza, Nitta-Gun, Gunma-Ken, Japan; Izumi Hoshino, 1328-3 Kizaki, Nitta-Machi-Oaza, Nitta-Gun, Gunma-Ken, Japan

[21] Appl. No.: 80,921
[22] Filed: Jun. 22, 1993
[51] Int. Cl.⁵ ............................ B23B 51/06; B23G 1/16
[52] U.S. Cl. ............................ 408/56; 408/67; 408/87; 470/96
[58] Field of Search ............... 408/56, 61, 67, 57, 408/87; 470/96, 99, 198; 184/6.14, 102

[56] References Cited

U.S. PATENT DOCUMENTS

| | | | |
|---|---|---|---|
| 2,548,314 | 4/1951 | Kinney, Jr. | 408/67 |
| 2,847,880 | 8/1958 | Neidig | 408/59 |
| 2,855,614 | 10/1958 | Simon | 408/56 |
| 3,227,012 | 1/1966 | Lemelson | 408/67 |
| 4,147,232 | 4/1979 | Gaunt et al. | 408/56 |

Primary Examiner—Daniel W. Howell
Attorney, Agent, or Firm—Ladas & Parry

[57] ABSTRACT

In a cutting oil supplying device supplying cutting oil to a tap which taps a work installed on a worktable, the device comprises a cup being filled with the cutting oil provided beneath the worktable and located at a tapping position, and a wiping means provided in the cup such that when the tap goes into and out of the cup, the wiping means wipes off excess oil and cutting dust and applies the least amount of the cutting oil necessary for cooling the tap and reducing friction between the tap and the work to the tap, where the wiping means is a flexible porous member such as a sponge for example.

13 Claims, 7 Drawing Sheets

CUTTING OIL SUPPLYING DEVICE FOR A TAP

FIELD OF THE INVENTION

This invention relates to a cutting oil supplying device. More specifically, this invention relates to a cutting oil supplying device for a tap which is used for internal threading.

PRIOR ART STATEMENT

In a tapping operation, cutting oil is used to reduce friction between a tap and a work. The cutting oil prevents the tap from wearing and cools heat generated at the tap. When the cutting oil is applied to the tap, the oil spreads on the work during the tapping operation. In the next step, therefore, solvents should be used to clean the work and the use of chlorofluorocarbons(CFCs) is common.

Though CFCs is the most suitable and convenient solvent, using CFCs shall be prohibited in the near future because it is believed that CFCs depletes ozone. Manufacturers seek to develop substitute solvents and cleaning systems without using CFCs, but the substitutes are costly and the cleaning systems incur higher costs.

SUMMARY OF THE INVENTION

The present invention has been developed to eliminate the above disadvantages of the prior art.

An object of the present invention is to provide a cutting oil supplying device which applies the least amount of cutting oil necessary for cooling the tap and reducing the friction between the work and the tap to the tap.

Another object is to provide a cutting oil supplying device which allows a cleaning-free tapping operation.

Still another object is to provide a cutting oil supplying device which prevents a bottom surface of the work from smearing with the cutting oil.

The first feature of the present invention relates to a cutting oil supplying device for a tap which is used for internal threading of a work installed on a worktable. The device comprises a cup which is provided beneath the worktable and located at a tapping position. A wiping means is provided in the cup being filled with cutting oil. When the tap goes into and out of the cup, the wiping means wipes off excess oil and applies the least amount of cutting oil necessary for cooling the tap and reducing friction between the tap and the work to the tap. As the preferred embodiments of the wiping means, a flexible porous member and a ring brush will be disclosed.

The second feature of the present invention relates to a cutting oil supplying device for multiple spindle tapping operations. The device comprises a workbench and several work supporters which are fixed adjustably to the workbench. The workbench is a plate having several mounting holes therein. The work supporter has a substantially rectangular solid body, one end portion of the body has a lower upper surface and one side of a bottom of the body extends to form an arm having an elongate groove. A cup for cutting oil is provided in the end portion of the body and is filled with a flexible porous member such as a sponge. A circular shaped groove is provided in an upper edge of the cup to facilitate catch overflowed oil and a cap having a hole therein is capped on an upper portion of the cup. A cutting oil supplying path is connected to a lower portion of the cup and extends through the body to a lower portion of the other end of the body. A cutting oil withdrawing path is connected to the circular shape groove and extends through the body to an upper portion of the other end of the body. The work is fixed on a plane surface formed by an upper plane surface of the body and an upper plane surface of the cap.

DESCRIPTION OF THE PREFERRED EMBODIMENT

First we describe a cutting oil supplying device for a multiple spindle tapping machine as the best mode for carrying out the invention.

Figure 1:
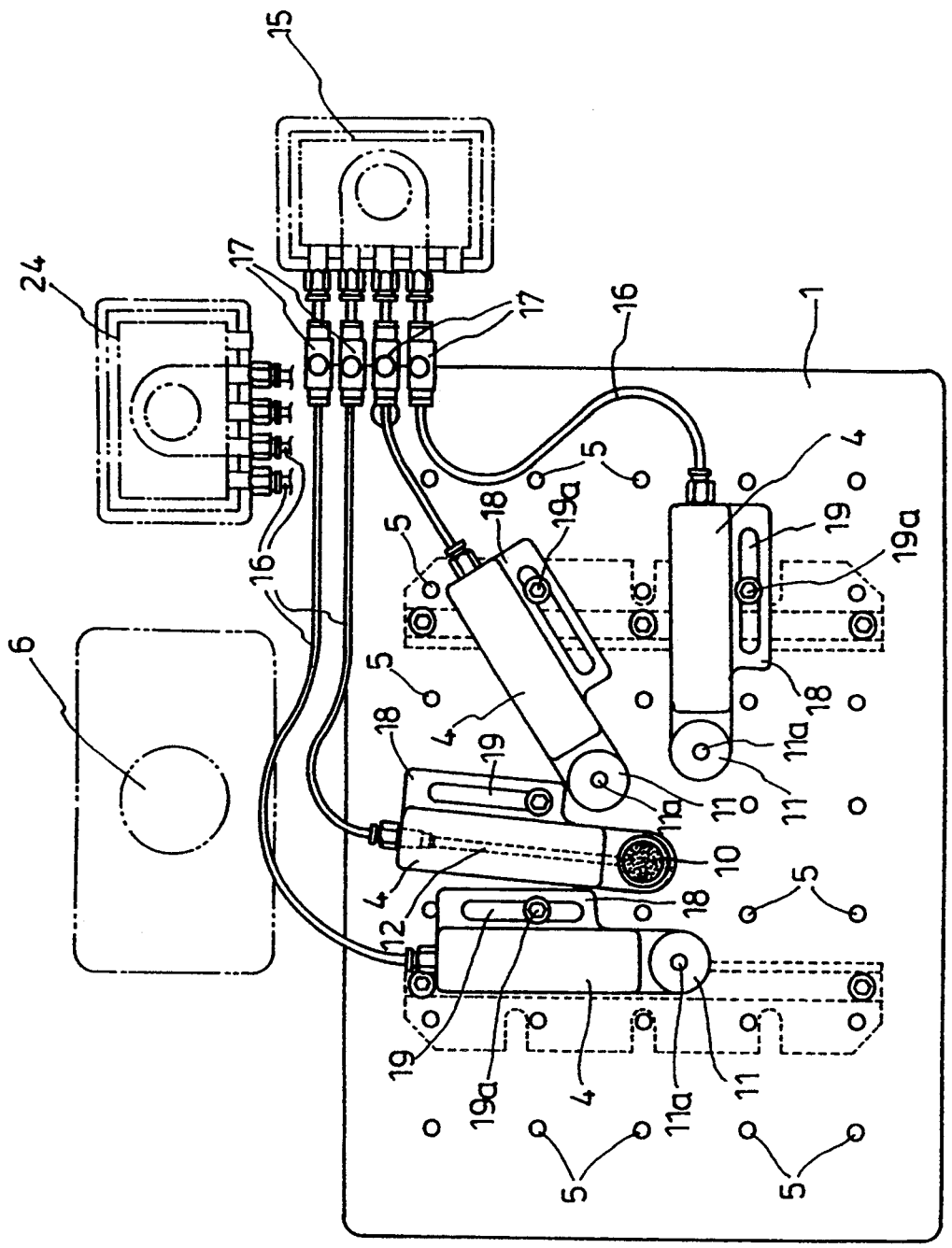
FIG. 1 is a plan view of a cutting oil supplying device.
Figure 2:
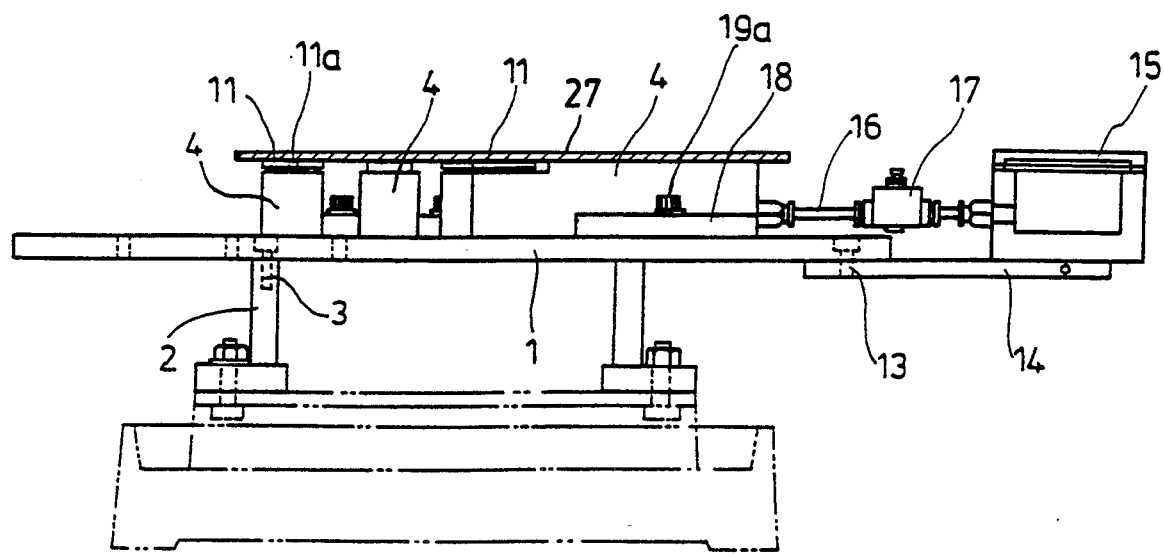
FIG. 2 is a side view of the cutting oil supplying device of FIG. 1.
Figure 3:
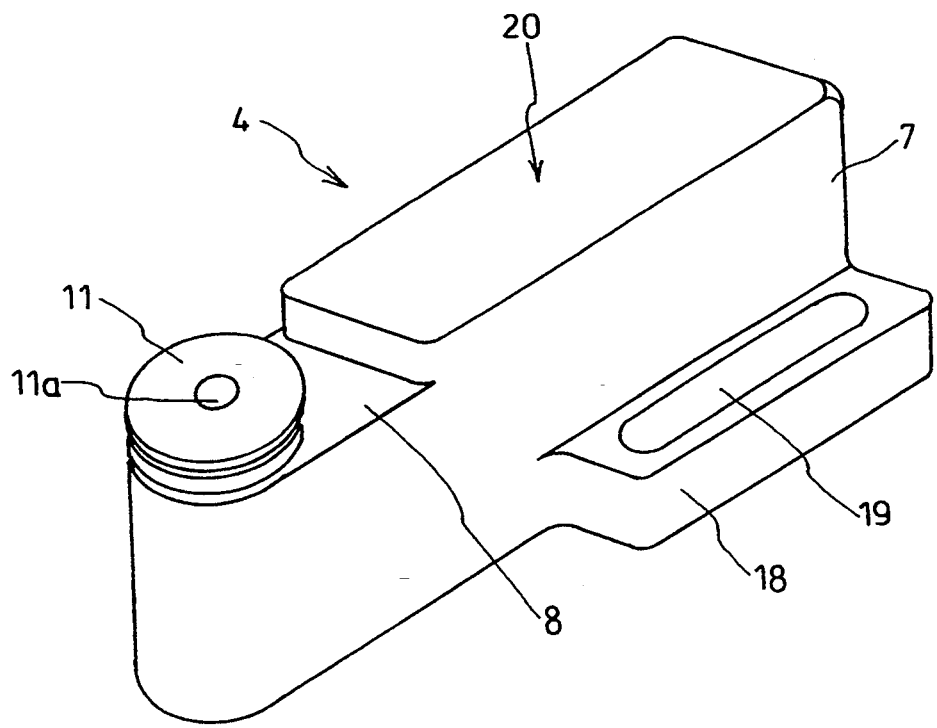
FIG. 3 is a perspective view of a work supporter.
Figure 4:
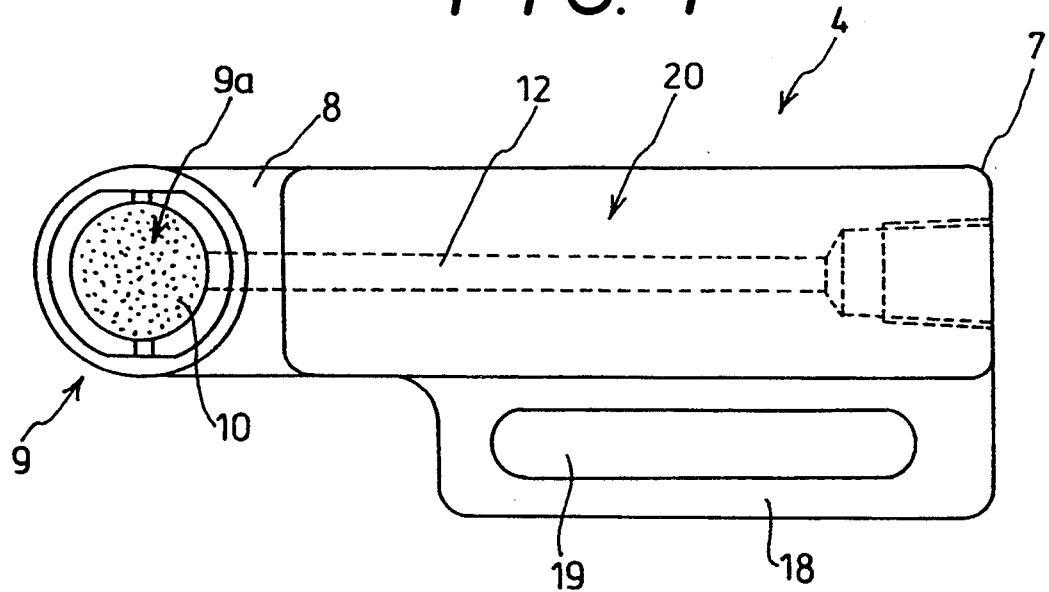
FIG. 4 is a plan view of the work supporter of FIG. 3, while without a cap.
Figure 5:
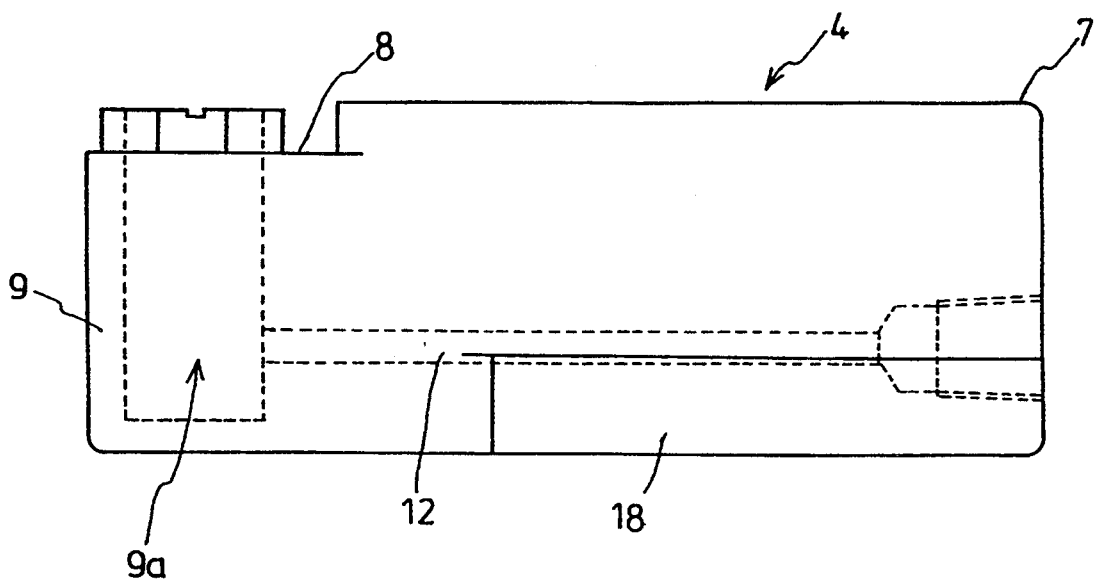
FIG. 5 is a side view of the work supporter of FIG. 4.
Figure 6:
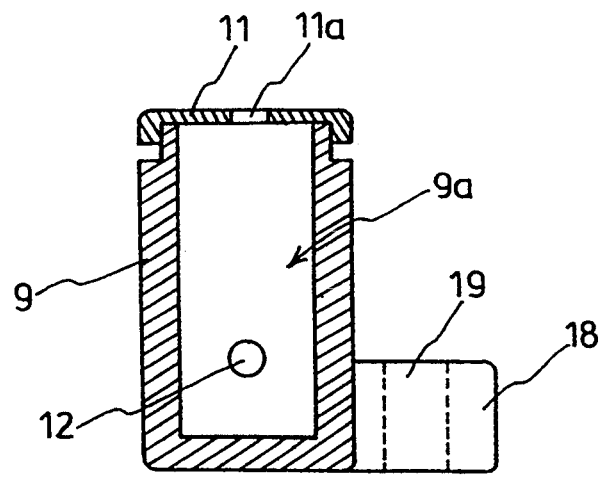
FIG. 6 is a vertical section showing an essential part of the work supporter of FIG. 3.

As shown in FIG. 1 and FIG. 2, reference numeral 1 denotes a workbench which is fixed to a supporter 2 horizontally by fastening means 3. The workbench 1 is a plate having several mounting holes 5 for securing means 19a which secures a work supporter 4,4 . . . to the workbench 1. A multiple spindle tapping machine 6 having four taps is installed at one side of the workbench 1.

The work supporter 4 is fixed adjustably to the workbench 1 and positioned at a tapping position. As shown in FIGS. 3 to 6, the work supporter 4 has a body 7 which is substantially a rectangular solid. One end portion 8 of the body has a lower upper surface and a cylindrical hole 9a is provided in the end portion 8 which serves as a cup 9 for cutting oil.

The cup 9 is filled with a flexible porous member 10 such as a sponge. A circular shaped cap having a hole for receiving the tap is capped on the upper portion of the cup 9. A cutting oil supplying path 12 is connected to a lower portion of the cup 9 and extends through the body to a lower portion of the other end of the body 7. An oil tank 15 is mounted on a stay 14 which is connected to the workbench 1 by securing means 13. The cutting oil supplying path 12 is connected to the oil tank 15 by a flexible pipe 16 and a valve 17. One side of a bottom of the body 7 extends to form an arm 18 having an elongate groove 19. The work supporter 4 is fixed adjustably to the hole of the workbench 1 by fastening means 19a and the position of the work supporter 4 is adjustable within the groove 19. The work is to be fixed on a horizontal plane surface 20 which is formed by an upper plane surface of the body 7 and an upper plane surface of the cap 11.

Figure 7:
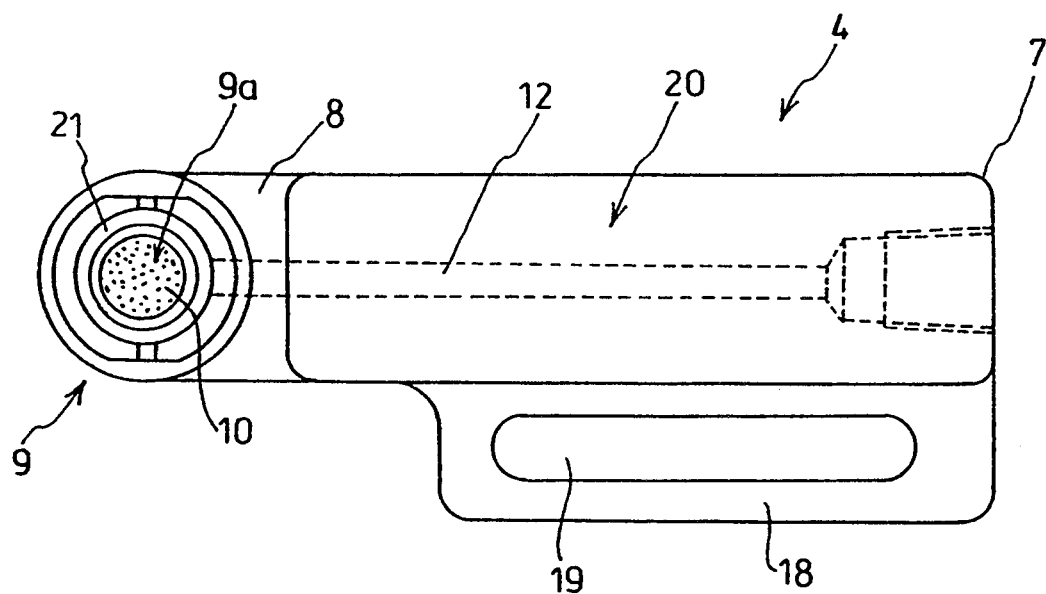
FIG. 7 is a plan view of a work supporter of another embodiment, while without a cap.
Figure 8:
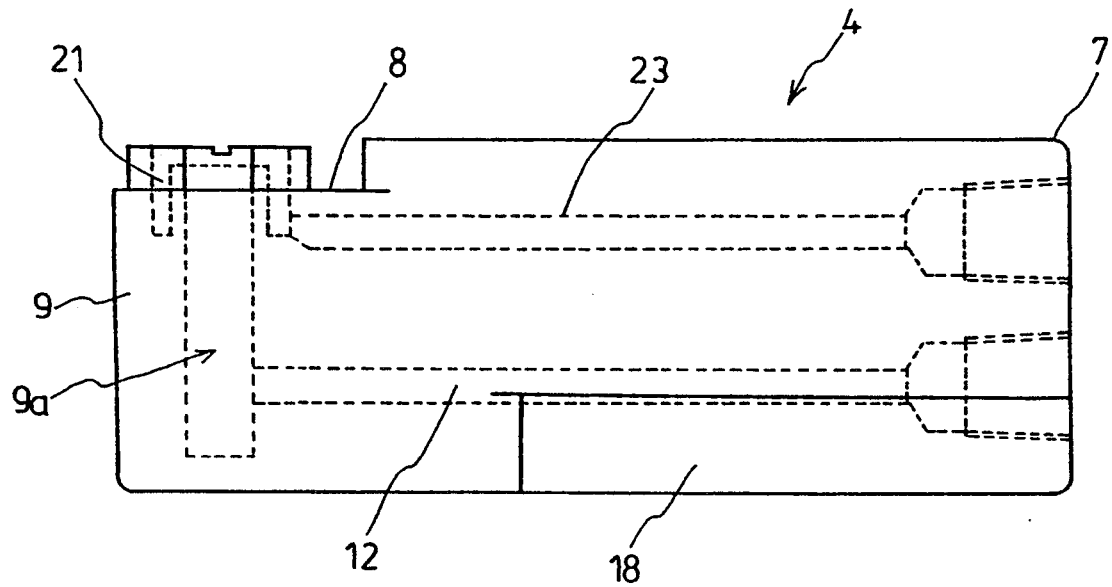
FIG. 8 is a side view of the work supporter of FIG. 7.
Figure 9:
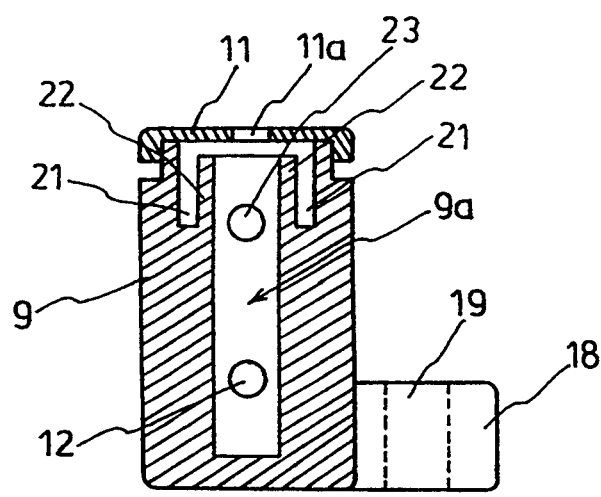
FIG. 9 is a vertical section showing an essential part of the work supporter of FIG. 7, while with the cap.

FIGS. 7 to 9 show another embodiment of the work supporter 4. According to the embodiment, a circular shaped groove 21 is provided in an upper edge of the cup 9 to facilitate catch overflowed oil. A cutting oil withdrawing path 23 is connected to a lower portion of the groove 21 and extends through the body to an upper portion of the other end of the body 7. The cutting oil withdrawing path 23 is connected to a tank 24 by the flexible pipe 16.

When operating the tapping machine 6, first determine a position of the work supporter 4, then fix the work supporter 4 to the workbench 1 by the fastening means 19a. Next, put the work on the plane 20 and fix the work by fixing means (not shown), then start tapping. When the tap goes through the work, getting into and out of the cup 9, the tap is wiped off by the sponge 10 and the least amount of cutting oil necessary for cooling the tap and reducing the friction between the tap and the work is applied to the tap. Therefore, the present invention prevents the oil from spreading on the work during the tapping operation. Though a very small amount of oil might remain in a thread of the work, such oil should dry quickly because volatile oil is used. The present invention provides a cutting oil supplying device which allows a cleaning-free tapping operation.

When the cutting oil is overflowed due to a trouble of the valve 17 for example, the oil is caught by the groove 21 and withdrew in the tank 24 by the withdrawing path 23. There is always an adequate level of the cutting oil in the cup 24 so that a bottom surface of the work is free from the cutting oil.

FIG. 10 to FIG. 13 show another embodiment whose wiping means comprises a ring brush and a filter.

Figure 10:
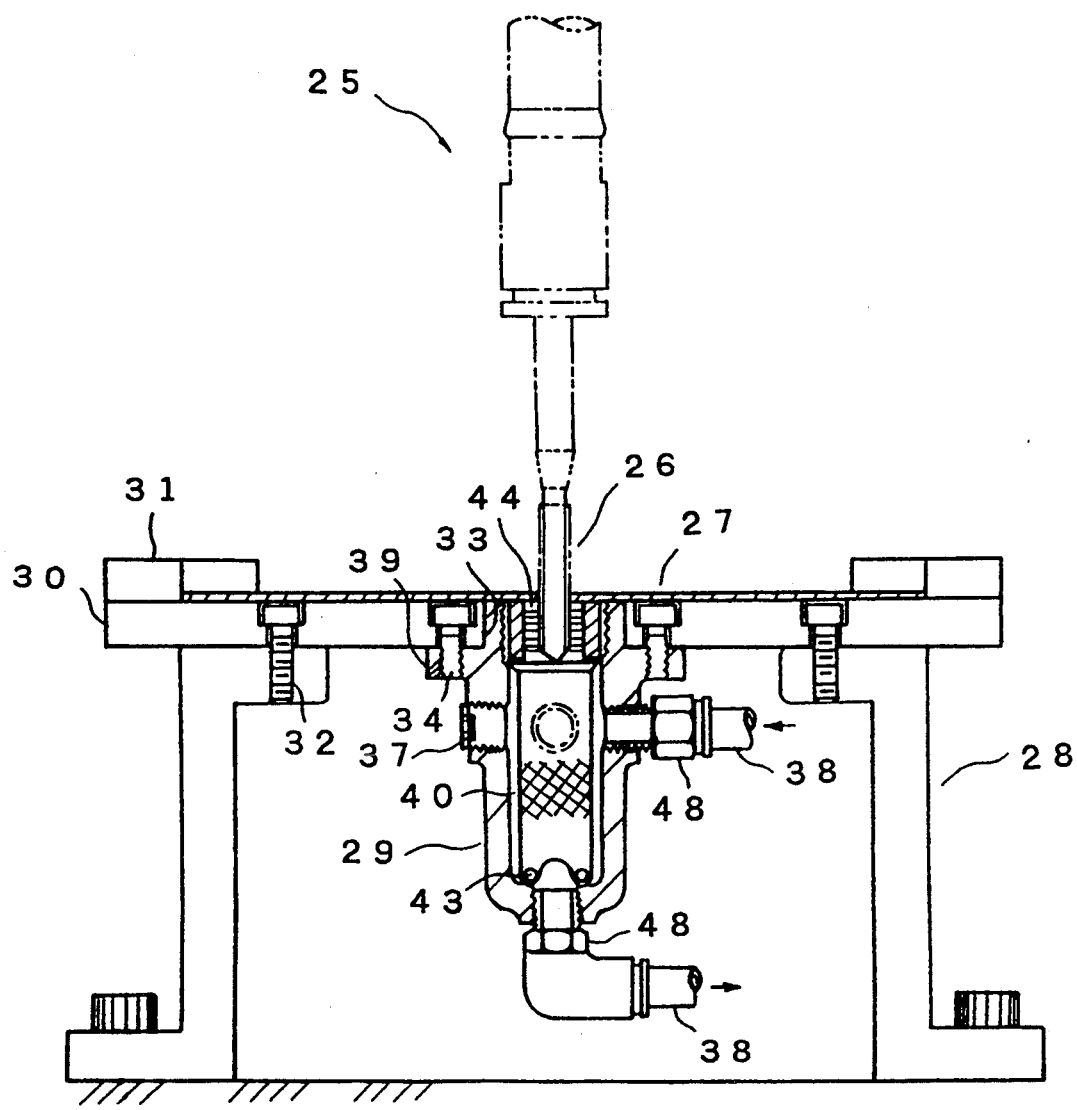
FIG. 10 is a sectional view showing a cutting oil supplying device of another embodiment.
Figure 11:
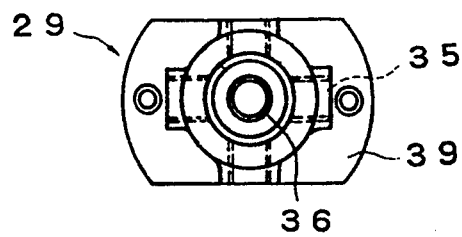
FIG. 11(a) shows a cup for cutting oil in a plan view thereof and FIG. 11(b) shows a vertical section thereof.
Figure 11:
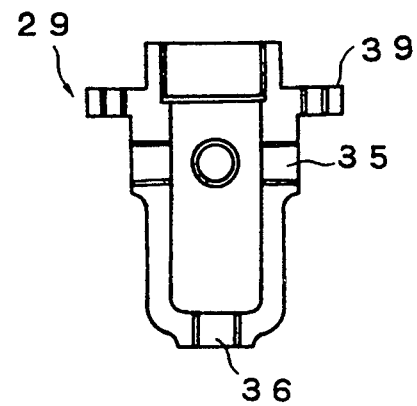
Figure 12:
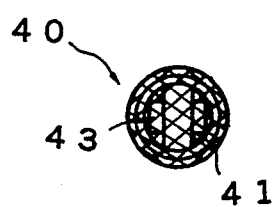
FIG. 12(a) shows a filter in a plan view thereof and FIG. 12(b) shows a vertical section thereof.
Figure 12:
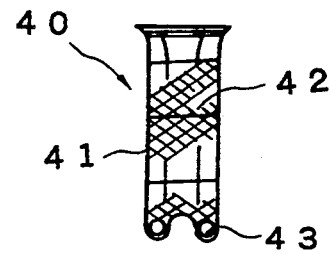
Figure 13:
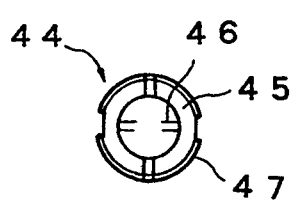
FIG. 13(a) shows a ring brush in a plan view and FIG. 13(b) shows a vertical section thereof.
Figure 13:
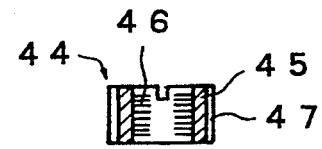

In FIG. 10, a tapping machine 25 makes a thread in a work 27 using a tap 26. The work 27 is provided on a base 30 which is supported by a supporter 28 and secured to the supporter 28 by a screw 32. Reference numeral 31 denotes a positioning guide for the work 27 which is installed at a corner of the base 30. A cup 29 having a flange 39 is secured to an opening 33 of the base 30 by a screw 34. Four ports 35 are provided in a side wall of the cup 29 and another port 36 is provided in a bottom of the cup 29. Reference numeral 37 denotes a cap which closes the ports 35 not being used. In case of multiple spindle tapping operations, the cap 37 is removed and each port 35, 36 are connected to form a cutting oil circular path 38.

A filter 40 is arranged in the cup 29. The filter 40 has a cylindrical body comprising a bottom and net body 41. A cutting oil mark 42 is marked in the middle of the net body 41 to show a level of the cutting oil. A ferrite magnet 43 is provided in the bottom of the filter 40 to facilitate collection of metal particles such as cutting dust if the work is made of steel.

A ring brush 44 is provided above the filter 40 and secured to the cup 29. The ring brush 44 is the wiping member which wipes the tap 26, withdraws the metal particles and applies the least amount of cutting oil necessary for tapping to the tap 26. The ring brush 44 comprises a short cylindrical body 45 and a brush 46 provided in an inner surface of the body 45. The ring brush 44 is secured to the cup 29 by a screw 47 which is provided on an exterior surface of the body 45.

In tapping, the ring brush 44 wipes off excess oil and the metal particles from the tap 26. The metal particles are filtered by the filter 40. By using a pump (not shown), cutting oil can circulate through the path 38 which is connected to the ports 35, 36 respectively by a connector 48, 48.

We claim:

1. A cutting oil supplying device supplying cutting oil to a tap which taps a work installed on a worktable comprising:
   (a) a cup to be filled with the cutting oil provided beneath said worktable and located at a tapping position; and
   (b) a wiping means provided in said cup such that when the tap goes into and out of the cup, said wiping means wipes off excess oil and applies the least amount of the cutting oil necessary for cooling the tap and reducing friction between the tap and the work to the tap.

2. A cutting oil supplying device as claimed in claim 1 wherein said wiping means is a flexible porous member.

3. A cutting oil supplying device as claimed in claim 2 wherein said flexible porous member is a sponge.

4. A cutting oil supplying device as claimed in claim 2 wherein a cutting oil supplying path is connected to said cup.

5. A cutting oil supplying device as claimed in claim 4 wherein a cutting oil withdrawing path is connected to said cup.

6. A cutting oil supplying device as claimed in claim 2, said device comprising:
   (a) a workbench supported horizontally by legs;
   (b) at least one work supporter which is fixed adjustably to said workbench; and
   (c) said work supporter having a substantially rectangular solid body, one end portion of said body having a lower upper surface, a cup for the cutting oil being provided in said end portion, said cup being filled with a flexible porous member, a cap having a hole therein being capped on an upper portion of said cup, a cutting oil supplying path being connected to a lower part of said cup and extending through said body to a lower portion of the other end of said body, and an upper horizontal plane surface of the body and an upper plane surface of said cap forming a resting surface for the work.

7. A cutting oil supplying device as claimed in claim 6 wherein said workbench is a plate having at least one mounting hole therein and one side of a bottom of said body extends to form an arm having a groove.

8. A cutting oil supplying device claimed in claim 6 wherein a circular shaped groove is provided in an upper edge of said cup to facilitate catch overflowed oil, and a cutting oil withdrawing path is connected to said circular shaped groove and extends through said body to an upper portion of the other end of said body.

9. A cutting oil supplying device as claimed in claim 8 wherein said flexible porous member is a sponge.

10. A cutting oil supplying device claimed in claim 1 wherein said wiping means is a ring brush.

11. A cutting oil supplying device claimed in claim 10 wherein a filter is provided beneath said ring brush.

12. A cutting oil supplying device claimed in claim 11 wherein said cup has a mark to show a level of the cutting oil, at least one side port is provided above said mark, a bottom port is provided at a bottom of said cup and said side port and said bottom port are connected to form a cutting oil circulating path.

13. A cutting oil supplying device claimed in claim 12 wherein a magnet is provided in a lower part of said filter.

* * * * *

UNITED STATES PATENT AND TRADEMARK OFFICE
CERTIFICATE OF CORRECTION

PATENT NO. : 5,333,973
DATED : August 2, 1994
INVENTOR(S) : Kiyoshi Hoshino and Izumi Hoshino It is certified that error appears in the above-indentified patent and that said Letters Patent is hereby corrected as shown below:

Title page, left column, after "[22] Filed: Jun. 22, 1993", please insert

-- [30] Foreign Application Priority Data

August 11, 1992 [JP] Japan ....... 4-235376

December 3, 1992 [JP] Japan ....... 4-350333 --.

Signed and Sealed this

First Day of November, 1994

Attest:

BRUCE LEHMAN

*Attesting Officer*     *Commissioner of Patents and Trademarks*